US009000679B2

(12) United States Patent
Tsuda

(10) Patent No.: US 9,000,679 B2
(45) Date of Patent: Apr. 7, 2015

(54) STRAIGHT TUBE LED ILLUMINATION LAMP

(75) Inventor: Yuki Tsuda, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 71 days.

(21) Appl. No.: 14/005,554

(22) PCT Filed: Mar. 19, 2012

(86) PCT No.: PCT/JP2012/056993
§ 371 (c)(1),
(2), (4) Date: Sep. 17, 2013

(87) PCT Pub. No.: WO2012/128245
PCT Pub. Date: Sep. 27, 2012

(65) Prior Publication Data

US 2014/0009076 A1 Jan. 9, 2014

(30) Foreign Application Priority Data

Mar. 18, 2011 (JP) ................................ 2011-060128
Oct. 26, 2011 (JP) ................................ 2011-234782
Oct. 26, 2011 (JP) ................................ 2011-234784

(51) Int. Cl.
*H05B 37/02* (2006.01)
*H05B 33/08* (2006.01)
*F21K 99/00* (2010.01)

(52) U.S. Cl.
CPC .............. *H05B 33/0815* (2013.01); *F21K 9/17* (2013.01); *Y02B 20/386* (2013.01)

(58) Field of Classification Search
USPC ...... 315/185 R, 186, 200 R, 209 R, 291, 307, 315/308, 312
See application file for complete search history.

(56) References Cited

U.S. PATENT DOCUMENTS

2011/0058365 A1* 3/2011 Osawa .................... 362/217.01

FOREIGN PATENT DOCUMENTS

| | | |
|---|---|---|
| CN | 101715263 A | 5/2010 |
| JP | H02-123965 | 5/1990 |
| JP | 2004-192833 | 7/2004 |
| JP | 2006-244848 | 9/2006 |
| JP | 2008-103304 | 5/2008 |
| JP | 2011-040701 | 2/2011 |

* cited by examiner

*Primary Examiner* — Jimmy Vu
(74) *Attorney, Agent, or Firm* — Jianq Chyun IP Office

(57) ABSTRACT

This straight tube LED illumination lamp includes the following: an LED element; a first plug having an input-output terminal and an empty terminal; a second plug having an input-output terminal and an empty terminal; a first rectifier that is connected to the input-output terminal of the first plug and the empty terminal of the second plug in order to convert alternating current to direct current; a second rectifier that is connected to the input-output terminal of the second plug and the empty terminal of the first plug in order to convert alternating current to direct current; and a bypass circuit through which current is flown back from either the first or second rectifier to the other rectifier. The bypass circuit has a current-limiting resistor to prevent the first and second rectifiers from being damaged.

4 Claims, 3 Drawing Sheets

STRAIGHT TUBE LED ILLUMINATION LAMP

CROSS-REFERENCE TO RELATED APPLICATIONS

This application is a 371 application of an international PCT application serial no. PCT/JP2012/056993, filed on Mar. 19, 2012, which claims the priority benefit of Japan application serial no. 2011-060128, filed on Mar. 18, 2011, Japan application serial no. 2011-234782, filed on Oct. 26, 2011, and Japan application serial no. 2011-234784, filed on Oct. 26, 2011. The entirety of each of the above-mentioned patent applications is hereby incorporated by reference herein and made a part of this specification.

TECHNICAL FIELD

The present invention relates to a straight tube LED (light-emitting diode) illumination lamp including a rectifier converting an alternating current to a direct current. In particular, the present invention relates to a straight tube LED illumination lamp that can be installed in an existing fluorescent light equipment.

BACKGROUND TECHNIQUE

An LED element has been widely used in a signaling light, an electric bulletin board, a backlight of a display device and a car light as a light source for display or illumination. In addition, an LED light bulb which is replaceable of a traditional filament bulb has been put on the market. The LED light bulb has some advantages. Of the same light amount, the power consumption of an LED light bulb is lower than that of the filament bulb. Also, the LED light bulb can obtain the maximum amount of light at the time of turning it on.

For a fluorescent light, an ultraviolet light is converted into a visible light by a fluorescent material applied on an inside wall of a glass tube. After two filament electrodes of the fluorescent light are preheated before the discharge, an instantaneous high voltage is applied between both electrodes. As a result, thermal electrons are emitted from a cathode filament to an anode filament by the discharge phenomenon, and ultraviolet light is generated by the collisions of the thermal electrons and mercury particles.

A certain type of a fluorescent lighting fixture includes a starter that preheats the filament electrodes to generate an instantaneous high voltage. The fluorescent lighting fixture further includes a ballast that maintains the current to a constant value after the discharge occurs. Three lighting methods, which are called a glow tube starter type, a rapid start type and an inverter type, are known. Various ballasts are used even though the fluorescent lighting fixtures are lit with the same lighting method.

The LED illumination lamp includes a rectifier that converts a commercial alternating current into a direct current in order to supply a direct current to multiple LED elements. In addition, the LED illumination lamp requires a constant current circuit to supply a constant current to the LED elements for stabilizing brightness. A capacitive constant current circuit is well known for smoothing a direct current voltage outputted from the rectifier by a smoothing capacitive. The capacitive constant current circuit can derive a voltage waveform that is close to an ideal direct current voltage while a structure is relatively simple.

The smoothing capacitor of the capacitive constant current circuit consists of electrolytic capacitor since a large current capacity is demanded. An electrolytic capacitor with low durability shortens the lifetime of an LED illumination lamp. Also, a countermeasure for any damage of the electrolytic capacitor is required.

A semiconductor constant current circuit using a diode is safer than the capacitive constant current circuit. However, the semiconductor constant current circuit cannot remove a ripple of the current to a degree of stably lighting the LED elements. In recent years, most of constant current circuits of LED illumination lamps become chopper type constant current circuits. A chopper type constant current circuit can prevent the ripple of the current by repeatedly switching on and off a switching element at a high frequency. As a result, a flickering that can be sensed by human beings can be prevented.

Rewiring work is required when the LED light, replaced with the fluorescent light, is installed in a fluorescent light equipment. This rewiring work includes works for disconnecting an existing ballast from an alternating-current power supply and removing a glow starter. When a straight tube LED illumination lamp equipped with a certain type of direct current power supply is installed in the fluorescent light equipment, it may not be easy to reinstall a fluorescent light therein. It may also not be easy to install therein a straight tube LED illumination lamp equipped with another type of direct current power supply.

The patent document 1 discloses a straight tube LED illumination lamp which can be installed in a fluorescent light equipment. According to the invention of the patent document 1, a rewiring work is not required, and anyone with no technical knowledge can install the straight tube LED illumination lamp to the existing fluorescent light equipment. Since a structure of the straight tube LED illumination lamp is simple, a manufacturing cost can remain low.

PRIOR ART DOCUMENTS

Patent Documents

Patent Document 1: Japanese Patent-Laid Open No. 2004-192833

SUMMARY OF THE INVENTION

When the switching on and off of a switching element in a chopper type constant current circuit is frequently repeated, the amount of light of a straight tube LED illumination lamp becomes unstable. Also, when the straight tube LED illumination lamp is installed in an existing fluorescent light equipment, at the time of startup, a high voltage is applied from a ballast, and an inrush current is applied to an LED illumination lamp, which likely causes damages to the LED illumination lamp.

In view of above, a straight tube LED illumination lamp is provided that is not easy to break down. In addition, the other object to the present invention is to provide a straight tube LED illumination lamp wire, in which the amount of the light is stable and flickering is prevented. Several advantages that can be achieved by the straight tube LED illumination lamp wire of the present invention are described in below.

A straight tube LED illumination lamp of the present invention includes LED elements, a first plug having an input-output terminal and an empty terminal, a second plug having an input-output terminal and an empty terminal, a first rectifier that is connected to the input-output terminal of the first plug and the empty terminal of the second plug in order to convert alternating current to direct current, a second rectifier that is connected to the input-output terminal of the second plug and the empty terminal of the first plug in order to convert alternating current to direct current, and a bypass circuit that sends current back from either the first or second rectifier to the other rectifier. The bypass circuit has a current-limiting resistor (RA) to prevent the first and second rectifiers from being damaged.

It is preferred that the bypass circuit further includes a switch to block the bypass circuit. The reference numbers were added for easier understanding of the invention. There is no intention to limit the present invention to the LED light shown in the drawings.

The straight tube LED illumination lamp of the present invention includes LED elements, rectifiers converting alternating current to direct current, a switching element is located in series between the rectifier and the LED elements, a detector detecting an actual direct current provided to the LED elements, and a high frequency pulse generator repeatedly switching on and off of the switching element in a high frequency for maintaining the actual direct current to a set value. The high frequency pulse generator switches the switching element to an “OFF” state and maintains the switching element in the “OFF” state for a fixed “OFF” time when the actual direct current exceeds the set value.

It is preferred that the fixed “OFF” time is long enough to maintain the switching element to the “OFF” state, and short enough not to generate a flicker, even though the actual direct current becomes lower than the set value.

The inrush current, generated immediately after lighting, flows into the bypass circuit. As a result, a current which exceeds an acceptable value is not supplied to the constant current circuit and the LED elements. In addition, the amount of light of the LED elements immediately after lighting becomes constant.

The switching element is switched to the “OFF” state when an vibrating direct current exceeds the set value, and the switching element is kept off for a sufficiently long and fixed period of time. As a result, the switching on-and-off of the switching element is not repeated frequently, and the amount of light becomes constant. In addition, the switching element hardly fails.

DESCRIPTION OF PREFERRED EMBODIMENTS

Figure 1:
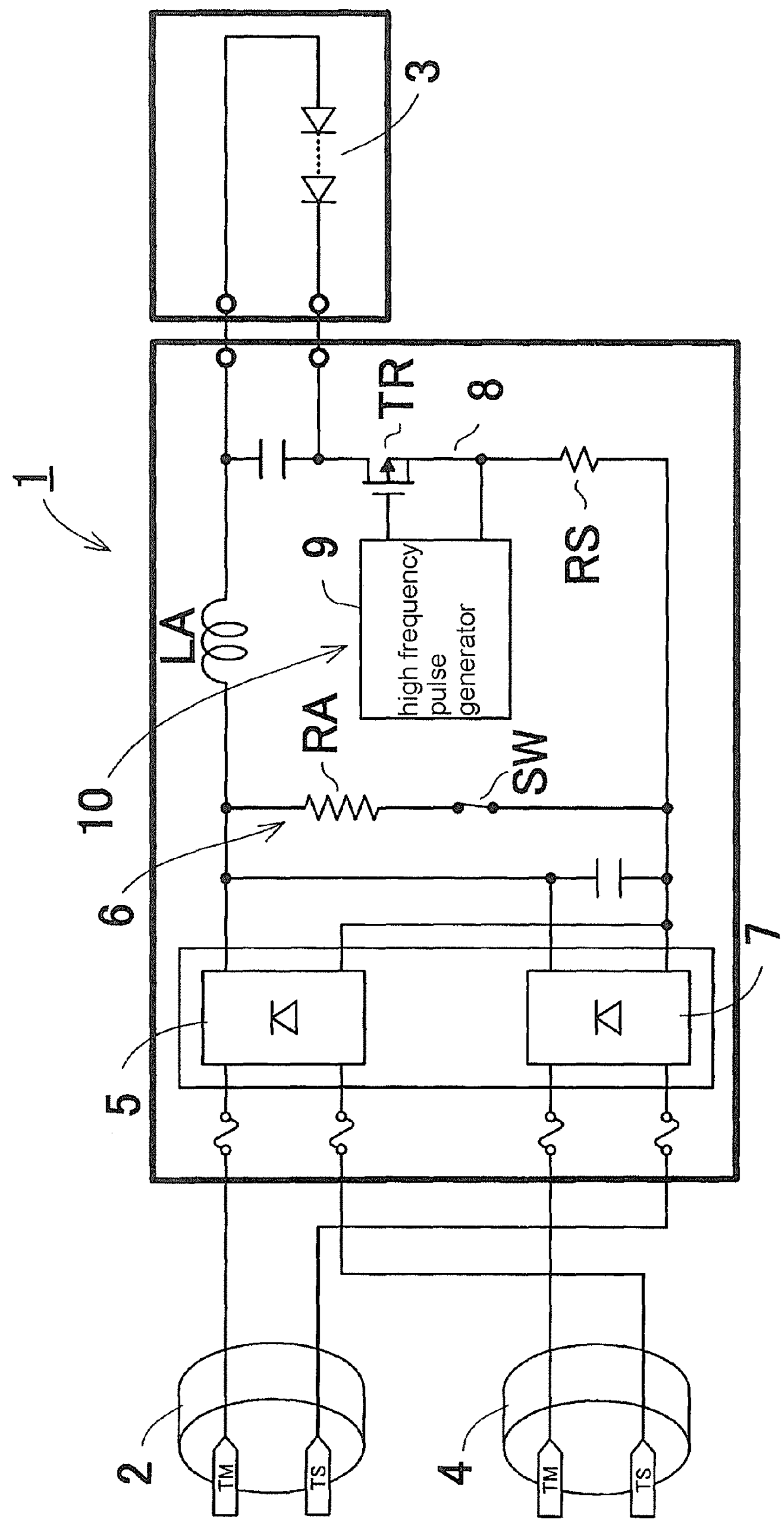
FIG. 1 is a circuit diagram illustrating an example of a straight tube LED illumination lamp of the present invention.

Referring to figures, a straight tube LED illumination lamp of the present invention is described. Elements that are not directly related to the present invention are omitted from the figures. The same elements are assigned by the same reference numbers. As shown in FIG. 1, the straight tube LED illumination lamp 1 includes a plurality of LED elements 3, a pair of plugs 2, 4, rectifiers 5, 7, a bypass circuit 6 and a chopper type constant current circuit 10. The plugs 2, 4 are respectfully located at both ends of a straight tube. The plurality of LED elements 3, the rectifiers 5, 7, the chopper type constant current circuit 10 and the bypass circuit 6 is stored inside the straight tube.

The plurality of LED elements 3 is connected to the rectifiers 5, 7 in series. The plurality of LED elements 3 is mutually connected in series. The amount of light emitted by the plurality of LED elements 3 is in accordance to an amount of the direct current provided by the rectifiers 5, 7. Therefore, when the rectifiers 5, 7 constantly provide the same amount of direct current, a load and the amount of light on each LED element 3 are determined by a number of the LED elements 3. A serial string of LED elements 3 is shown in FIG. 1, but plural serial strings of LED elements 3 can be applied.

Figure 2:
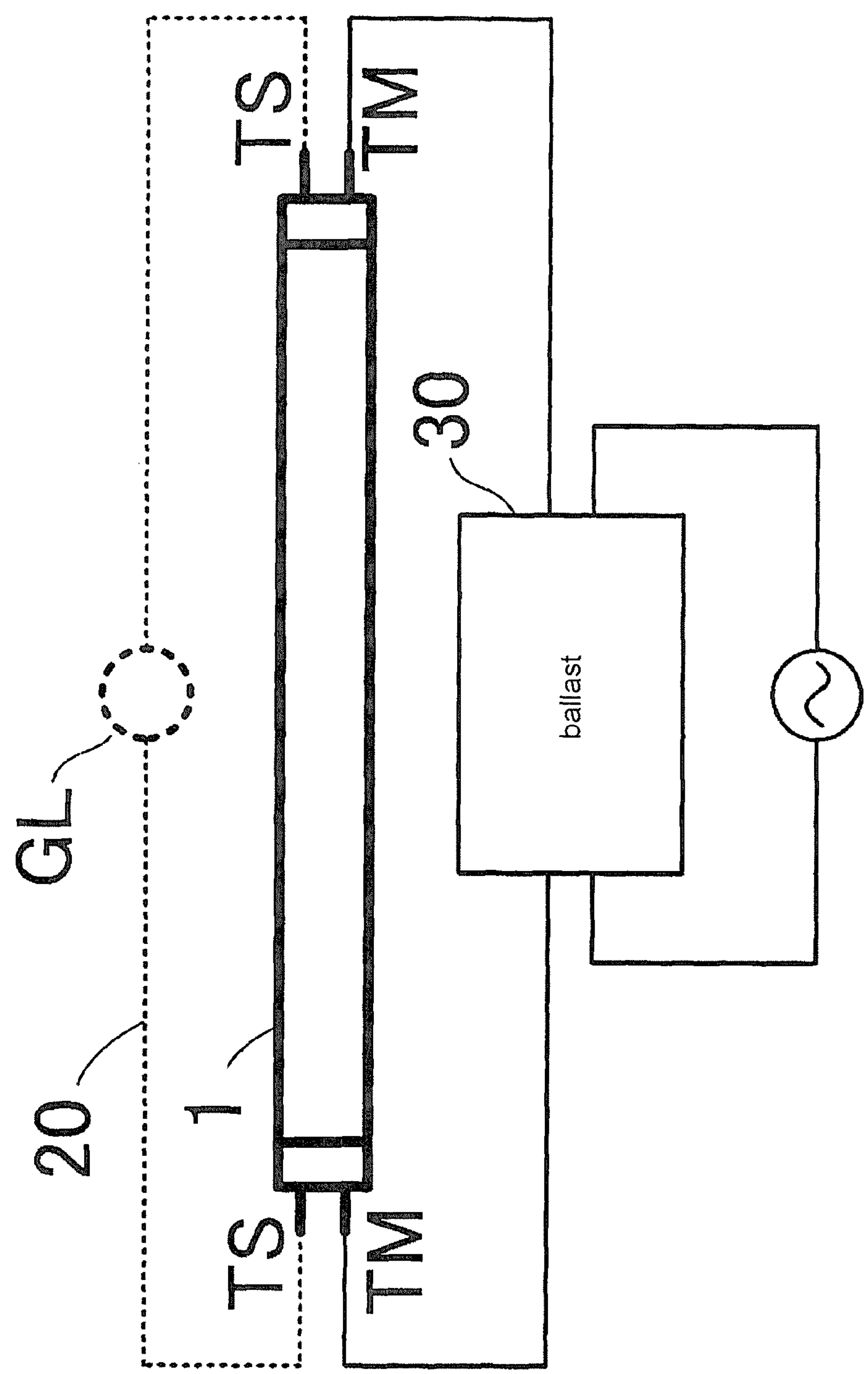
FIG. 2 is a circuit diagram illustrating the straight tube LED illumination lamp installed in the glow tube starter type fluorescent lighting fixture instead of the fluorescent tube.
Figure 3:
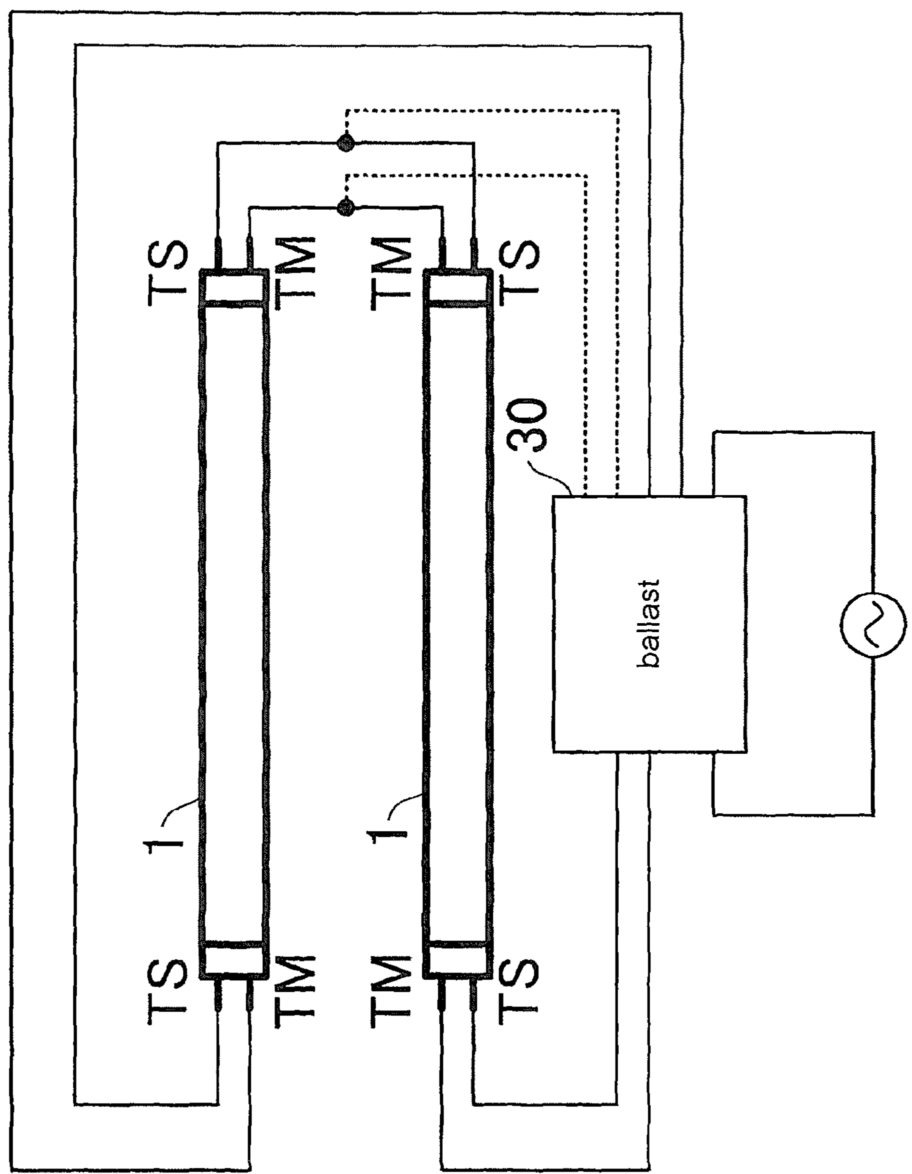
FIG. 3 is a circuit diagram illustrating the straight tube LED illumination lamp installed in the rapid start type two-lamp fluorescent lighting fixture.

The straight tube LED illumination lamp 1 has a total length and a maximum outer diameter the same as those of the to-be-replaced fluorescent light. Each plugs 2, 4 has two terminal pins that have the same standard as a base of the fluorescent light. For example, the plugs 2, 4 are the same as the base G13, which is defined by Japan Industrial Standard (JIS), for the fluorescent light. As shown in FIG. 2 or FIG. 3, the straight tube LED illumination lamp 1 can be installed in an existing fluorescent light equipment equipped with a ballast 30.

The plugs 2, 4 respectively have an input-output terminal TM and an empty terminal TS. The input-output terminal TM is located in order to pass an alternating current through the ballast 30. The empty terminal TS refers to a terminal that is not connected to a circuit providing an electric power to the LED elements 3. The empty terminal TS shown in FIG. 2 is connected to a preheating circuit 20.

The rectifiers 5, 7 are diode bridge circuits and are silicon rectifies performing a single phase full-wave rectification. The rectifiers 5, 7 are direct current power supplies converting the alternating current to the direct current. The first rectifier 5 is connected to the input-output terminal TM of the first plug 2 and the empty terminal TS of the second plug 4. The second rectifier 7 is connected to the input-output terminal TM of the second plug 4 and the empty terminal TS of the first plug 2.

As shown in FIG. 2, the straight tube LED illumination lamp 1 can be installed in a glow tube starter type fluorescent lighting fixture. The alternating current is provided to the straight tube LED illumination lamp 1 through the ballast 30. It is desirable to remove a glow lamp GL and block a preheated circuit 20.

The chopper type constant current circuit 10 is provided in order to provide a constant current to the plurality of LED elements 3. The chopper type constant current circuit 10 is located between the rectifiers 5, 7 and the LED elements 3. The chopper type constant current circuit 10 is located closer to the LED elements 3 than the bypass circuit 6. Since the chopper type constant current circuit 10 is excellent in durability compared to a capacitive constant current circuit, the service life of the straight tube LED illumination lamp 1 is extended.

The chopper type constant current circuit 10 has a switching element TR which is arranged in series between the rectifiers 5, 7 and the LED elements 3. The chopper type constant current circuit 10 detects an actual direct current provided to the LED elements 3. The chopper type constant current circuit 10 maintains the turning-on of the switching element TR so that the actual direct current does not exceed a set value, and when the actual direct current exceeds the set value, the switching element TR is switched to the “OFF” state and maintained off for a fixed “OFF” time.

The period that the switching element TR is maintained turning on is called “ON time”, and the period that the switching element TR is maintained turning off is called "OFF time". The "ON time" depends on the actual direct current, and the "OFF time" is set to a fixed value. The chopper type constant current circuit 10 alternately repeats the "ON time" and the "OFF time".

When a vibrating direct current is provided to the chopper type constant current circuit 10 and the actual direct current exceeds the set value, the chopper type constant current circuit 10 switches the switching element TR to the "OFF" state and maintains the switching element TR to be turned off for the fixed "OFF" time. As a result, a repeat of the switching on and off of the switching element TR is not frequent. Therefore, the straight tube light amount of the LED illumination lump 1 becomes constant.

It is especially beneficial to install the straight tube LED illumination lamp 1 of the present invention to a rapid-start type two-lamp fluorescent lighting fixture. FIG. 3 shows two straight tube LED illumination lamps 1, which are identical, are installed in the rapid start type two-lamp fluorescent lamp fixture. The two straight tube LED illumination lamps 1 are connected in series. After the alternating current is provided to one of the two straight tube LED illumination lamps 1 through the ballast 30 at first, the alternating current is further provided to the other one of the two straight tube LED illumination lamps 1.

Therefore, a time "lag" is generated due to the switching on and off of each switching elements TR in the two straight tube LED illumination lamps 1. When the frequency of the repeatedly switching on and off of the switching element TR is high, the two straight tube LED illumination lamps 1 compete for the alternating current. As a result, the light amount between the two straight tube LED illumination lamps 1 becomes different.

In order to slow down the speed of response of the switching element TR to the actual direct current, the chopper type constant current circuit 10 maintains the switching element TR being turned off for the fixed "OFF" time. In other words, the "sensitivity" of switching the switching element TR to be turned on in response to the actual direct current becomes low. As a result, when the alternating current is provided to the two straight tube LED illumination lamps 1 in order, the LED illumination lamps 1 do not compete. The amounts of the direct current provided to the LED elements 3 each in the two straight tube LED illumination lamps 1 are not different, and the two straight tube LED illumination lamps are lit in the same amount of light.

A lower limit (a shortest) of the "OFF" time is a time period that a response for switching the switching element TR to the "ON" state is delayed, and the delaying is to an extent that the light amount of the LED elements 3 becomes stable. In particular, the time period that the response for switching the switching element TR to the ON state is delayed, and the delaying is to an extent that the two same straight tube LED illumination tubes connected in series do not compete for the alternating current. The certain OFF time is long enough to maintain the switching element TR turning off even though the actual direct current becomes lower than the set value.

An upper limit (a longest) of the "OFF" time is a time period that a pulsation of the direct current is suppressed, and the suppression is to an extent that human beings cannot sense the flickers. In other words, the fixed "OFF" time is short enough that the pulsation of the actual direct current does not generate the flickers. For example, for the chopper type constant current circuit 10 in the embodiment, a frequency of repeatedly switching on and off the switching element TR is set to 200 kHz. Alternatively, the "OFF" time is set to about several microseconds.

The chopper type constant current circuit 10, specifically, includes a series circuit 8 and a high frequency pulse generator 9, where the series circuit 8 has a high-speed switching element TR and a detection resister RS. The series circuit 8 is arranged in series between the rectifiers 5, 7 and the LED elements 3. In particular, the series circuit 8 is arranged closer to the side of the plurality of LED elements 3 than the bypass circuit 6. A plurality of series circuits 8 can be arranged in parallel to each other.

The high frequency pulse generator 9 generates a high frequency pulse which is higher than 100 kHz. The high frequency pulse generator 9 provides a gate signal to the switching element TR. The gate signal comprises an "ON" signal in which the switching element TR being turned on is maintained, and an "OFF" signal in which the switching element TR being turned off is maintained. While the actual direct current does not exceed the set value, the high frequency pulse generator 9 provides the "ON" signal to the switching element TR. The set value of the current, a frequency of the switching on and off of the switching element TR and the "OFF" time are set in advance in the high frequency pulse generator 9. The set value of the current determines the required amount of light.

The bypass circuit 6 is connected to the rectifiers 5, 7 in series and connected to the LED elements 3 in parallel. The bypass circuit 6 is arranged closer to the side of the rectifiers 5, 7 than the series circuit 8. Therefore, through the bypass circuit 6, a vibrating inrush current that is provided at a start-up from one of the rectifiers 5, 7 (a positive electrode) is flown back to the other one of the rectifiers 5, 7 (a negative electrode).

The direct current exceeding an acceptable value, which is provided from one of the rectifiers 5, 7, flows back to the other one of the rectifiers 5, 7 immediately after lighting. As a result, the inrush current at the start-up is not provided to the LED elements 3 and the chopper type constant current circuit 10, and the operation of the switching element TR becomes stable. The bypass circuit 6 has a switch SW. When the straight tube LED illumination lamp 1 is connected to a commercial alternating power without through the ballast, the bypass circuit 6 is not required. In this case, the bypass circuit 6 may be blocked by the switch SW.

The direct current is provided to the LED elements 3 and the chopper type constant circuit 10 in a state that the direct current stably passes through the rectifiers 5, 7 and an inductance element LA. As a result, the operation of the switching element TR becomes stable, and the light amount becomes stable immediately after lighting. In particular, when the straight tube LED illumination lamp 1 is installed in the rapid start type two-lamp fluorescent lamp fixture, the light amount of two straight tube LED illumination lamps 1 becomes equal immediately after lighting.

The bypass circuit 6 has a current limit resistor RA. The current limit resistor RA limits the current which flows back to the rectifiers 5, 7 in order to keep the rectifiers 5, 7 from being damaged. When an output voltage of the rectifiers 5, 7 are from 50V to 150V and a set value of the chopper type constant current circuit 10 is several hundred mA, a resistance value of the current limit resistor RA is, for example, about 1 MΩ. Since the current limit resistor RA stops the high voltage and the inrush current at the start-up, the rectifiers 5, 7 are prevented from being damaged.

Referring to FIG. 1 and FIG. 3, the operation of two straight tube LED illumination lamps 1 installed in a rapid start type two-lamp fluorescent lamp fixture is described. When a power switch of the rapid start type two-lamp fluorescent lamp fixture is switched to ON, a commercial alternating current is supplied to the ballast 30. After an alternating voltage supplied from the ballast 30 is applied to one of the straight tube LED illumination lamps 1, the alternating voltage is applied to the other straight tube LED illumination lamp 1.

In one straight tube LED illumination lamp 1, one of the rectifiers 5 and 7 starts to supply the direct current. Then, in other straight tube LED illumination lamp 1, one of the rectifiers 5 and 7 starts to supply the direct current. Each of the two straight tube LED illumination lamps 1 has the bypass circuit 6. Until the direct current reaches the set value and becomes stable, the inrush current flows back to the rectifiers 5, 7. As a result, in both of the two straight tube LED illumination lamps 1, the direct current supplied to the LED elements 3 reaches the set value and becomes stable. The LED elements 3 of each of the straight tube LED illumination lamps 1 can obtain an electric power for emitting light of the required amount of light.

The detection resister RS supplies a voltage ("a detected voltage"), which indicates an actual direct current supplied to the LED elements 3, to the high frequency pulse generator 9. The high frequency pulse generator 9 compares the detected voltage with a reference voltage. The reference voltage indicates the set value of the current. The high frequency pulse generator 9 controls the switching element TR for maintaining the actual direct current to the set value. As a result, a constant current is supplied to the LED elements 3, and the light amount becomes stable.

If the actual direct current exceeds the set value, the high frequency pulse generator 9 switches the switching element TR to OFF. Then, when the fixed "OFF" time has elapsed, the high frequency pulse generator 9 switches the switching element TR to the "ON" state again.

The straight tube LED illumination lamp 1 can be installed in the glow tube starter type fluorescent lamp fixture, the rapid start type one lighting fluorescent lighting fixture, and a rapid start type two-lamp fluorescent lamp fixture without a wire exchanging construction. A work burden of installing straight tube LED illumination lamps is decreased. The straight tube LED illumination lamp 1 includes the chopper type constant current circuit 10 of which the reliability is high.

The straight tube LED illumination lamp 1 has the switch SW to activate or deactivate the bypass circuit 6. The straight tube LED illumination lamp 1 can be connected to the commercial alternating power by the switch SW without through a ballast.

The straight tube LED illumination lamp of the present invention is not intended to be exactly the same as the configurations shown in figures. The straight tube LED illumination lamps shown in the figures are changeable within the scope of the idea of the present invention. For example, the inductance element LA located between the rectifiers 5, 7 and the LED elements 3 can be located at other places.

What is claimed is:

1. A straight tube LED illumination lamp, comprising:
- LED elements;
- a first plug having a first input-output terminal and a first empty terminal;
- a second plug having a second input-output terminal and a second empty terminal;
- a first rectifier, connected to the first input-output terminal of the first plug and the second empty terminal of the second plug to convert a first alternating current to a first direct current;
- a second rectifier, connected to the second input-output terminal of the second plug and the first empty terminal of the first plug to convert a second alternating current to a second direct current; and
- a bypass circuit, through which a current back is flown from one of the first rectifier and the second rectifier to the other one of the first rectifier and the second rectifier,
- wherein the bypass circuit has a current-limit resistor to prevent the first and second rectifiers from being damaged.

2. The straight tube LED illumination lamp according to claim 1, wherein the bypass circuit further comprises a switch in order to block the bypass circuit.

3. A straight tube LED illumination lamp, comprising:
- LED elements;
- a rectifier converting an alternating current to a direct current;
- a switching element, arranged in series between the rectifier and the LED elements;
- a detector detecting an actual direct current provided to the LED elements; and
- a high frequency pulse generating device repeatedly switching on and off the switching element at a high frequency for maintaining the actual direct current to a set value,
- wherein when the actual direct current exceeds the set value, the high frequency pulse generating device switches the switching element to an "OFF" state and maintains the switching element to off for a fixed "OFF" time.

4. The straight tube LED illumination lamp according to claim 3, wherein the fixed OFF time is long enough to maintain the switching element to the "OFF" state, and short enough not to generate a flicker even though the actual direct current becomes lower than the set value.

* * * * *